Oct. 15, 1929.

J. A. DAVEY ET AL

AIR COMPRESSOR

Original Filed March 16, 1925

Re. 17,457

3 Sheets-Sheet 1

Inventors
James A. Davey
Paul H. Davey
Charles L. Gaugler

By their Attorney

Gerald C. Moore

Oct. 15, 1929. J. A. DAVEY ET AL Re. 17,457

AIR COMPRESSOR

Original Filed March 16, 1925 3 Sheets-Sheet 2

Inventors
James A. Davey
Paul H. Davey
Charles L. Gaugler
By their Attorney

Oct. 15, 1929. J. A. DAVEY ET AL Re. 17,457

AIR COMPRESSOR

Original Filed March 16, 1925 3 Sheets-Sheet 3

Inventors
James A. Davey
Paul H. Davey
Charles L. Gaugler
By their Attorney
George Olcott Reissued Oct. 15, 1929

Re. 17,457

UNITED STATES PATENT OFFICE

JAMES A. DAVEY, OF SOUND BEACH, CONNECTICUT, AND PAUL H. DAVEY AND CHARLES L. GAUGLER, OF KENT, OHIO; SAID GAUGLER ASSIGNOR TO THE DAVEY TREE EXPERT COMPANY, OF KENT, OHIO, A CORPORATION OF OHIO

AIR COMPRESSOR

Original No. 1,636,291, dated July 19, 1927, Serial No. 15,717, filed March 16, 1925. Reissue No. 16,872, dated February 7, 1928, Serial No. 235,098, filed November 22, 1927. This application for reissue filed March 15, 1929. Serial No. 347,427.

This invention relates to air compressors, and particularly to an air compressor of the portable type adapted to be coupled with an automotive vehicle for driving the compressor. This application is a continuation in part of our application Serial No. 703,098, filed March 31, 1924, patent No. 1,685,150.

A portable air compressor of this type is of great value for supplying portable air driven tools, as, for example, saws, chipping tools, riveters, or the like, and is particularly useful where the tools must be taken to the work.

We provide an air compressor of simple and rugged construction which may be attached to the frame of an automotive vehicle and operative connection made to the engine thereof for driving the compressor. As the vehicle is always stationary when the compressor is in use, we provide auxiliary cooling means for the engine and also provide for cooling the compressor. We have found that it is highly desirable to provide this additional cooling means as the compressor imposes a heavy load on the engine and the efficiency of the cooling means usually provided is reduced by reason of the fact that the vehicle is standing stationary.

In apparatus of this character it is highly desirable to keep the construction as light as is consistent with good construction, and we have found that the ordinary valve mechanism will not stand up under the severe conditions imposed upon portable apparatus of this character. We therefore construct the cylinder heads and adjacent portions of the apparatus of a metal having very high thermal conductivity, as, for example, aluminum, and provide for discharging air outwardly against the inner surface of this head. We have found that the particular construction which we employ is highly desirable in this form of compressor and gives exceptionally good results.

We preferably employ an air compressor having two opposed cylinders but have found that in any event the intermittent load imposes an extremely heavy load upon the connection between the compressor and the engine. We have found that where an unyielding connection is employed the parts will break and very unsatisfactory results are obtained. We provide a flexible driving connection in which may also be incorporated a clutch for connecting or disconnecting the compressor and the engine.

In the accompanying drawings, illustrating the present preferred embodiment of our invention:

Figure 1:
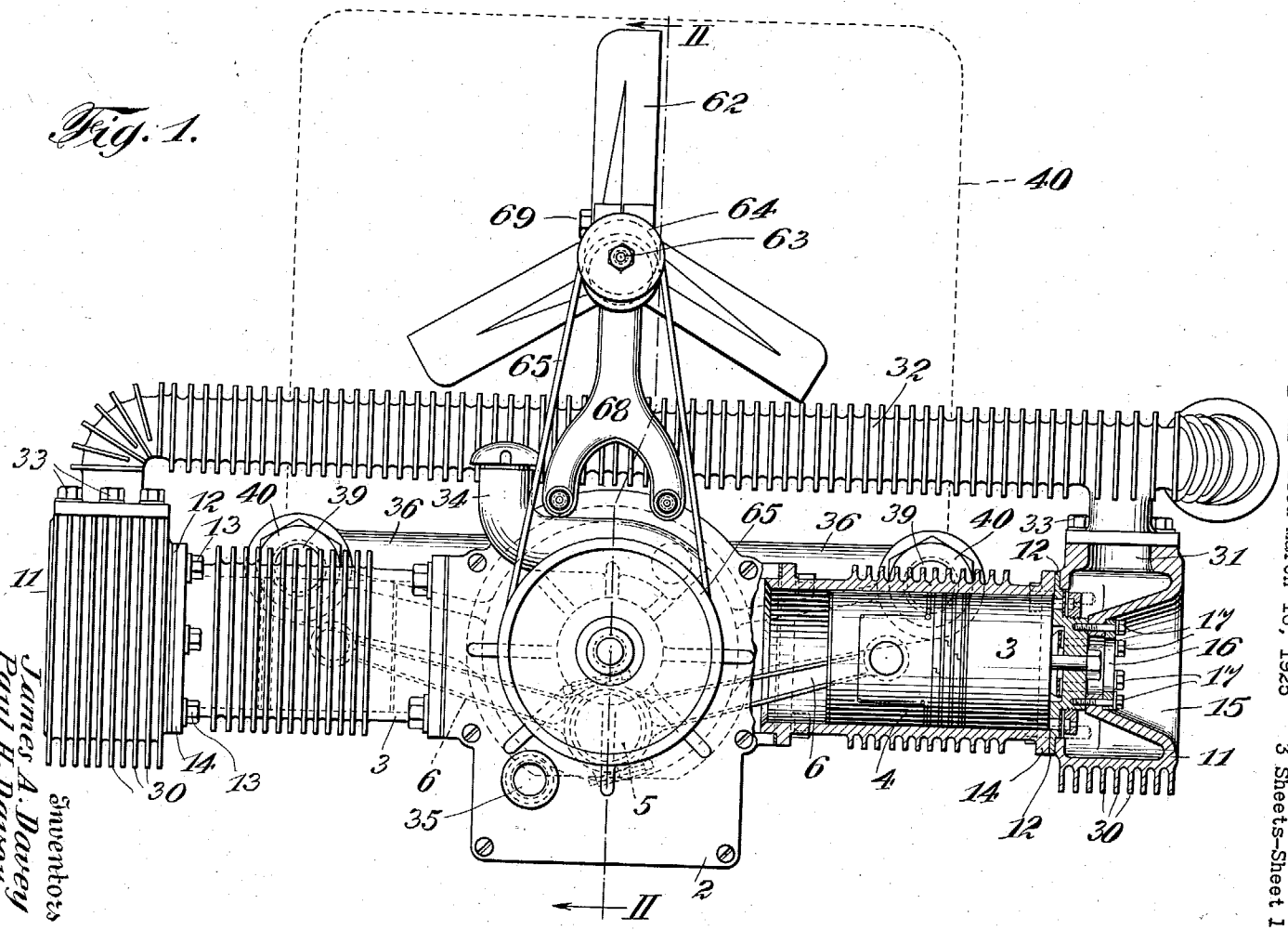
Figure 1 is a front view, partly broken away, of the present preferred embodiment of our invention, and showing the manner of connecting the same to the frame work of an automotive vehicle.
Figure 5:
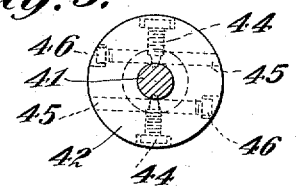
Figure 5 is a section on the line V—V of Figure 2.
Figure 4:
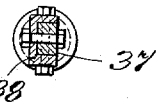
Figure 4 is a section on line IV—IV of Figure 3.
Figure 2:
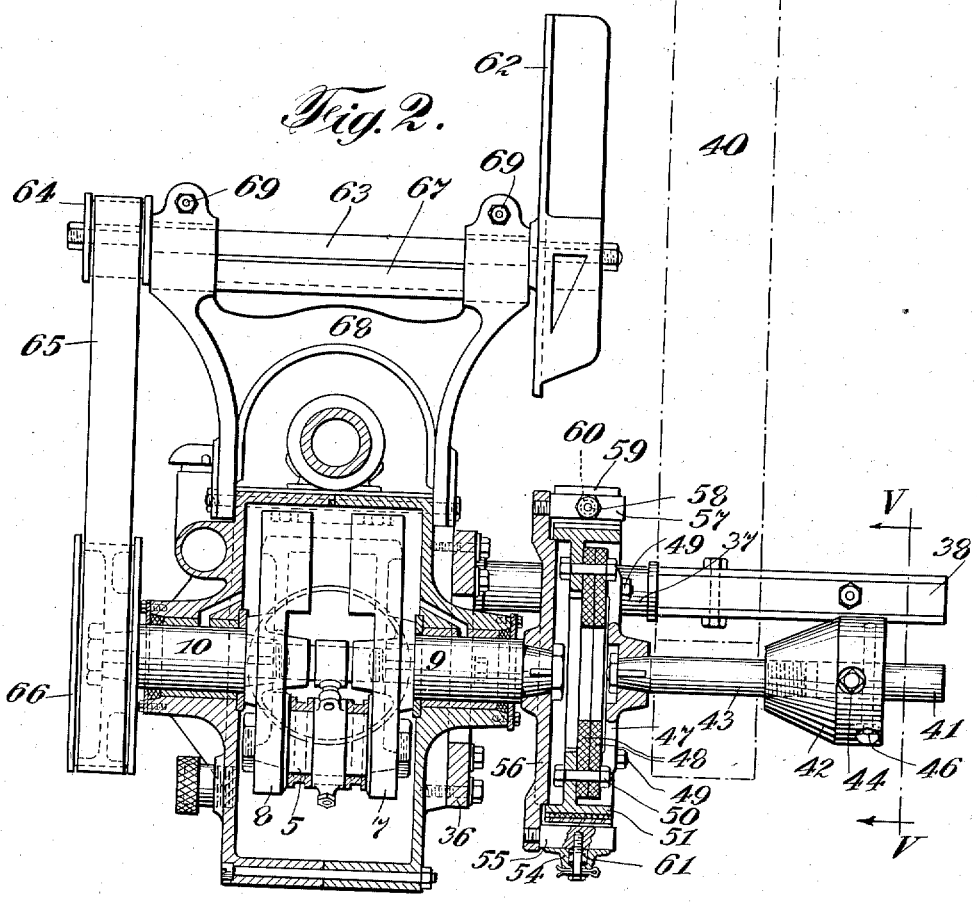
Figure 2 is a vertical section on the line II—II of Figure 1.
Figure 3:
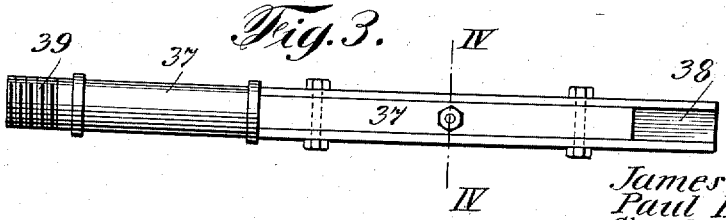
Figure 3 is a side elevation of a connecting member used for attaching the compressor to the frame work of the automotive vehicle.
Figure 8:
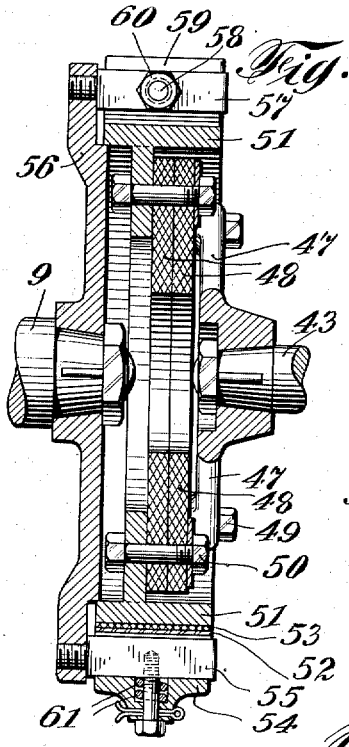
Figure 8 is a view to an enlarged scale of the clutch mechanism shown in Figure 2.
Figure 9:
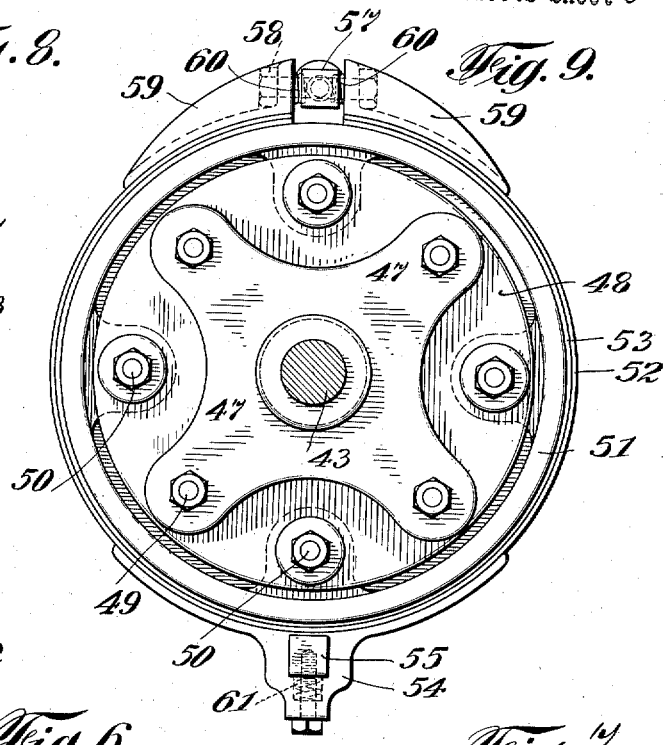
Figure 9 is an end view of the structure shown in Figure 8.
Figure 6:
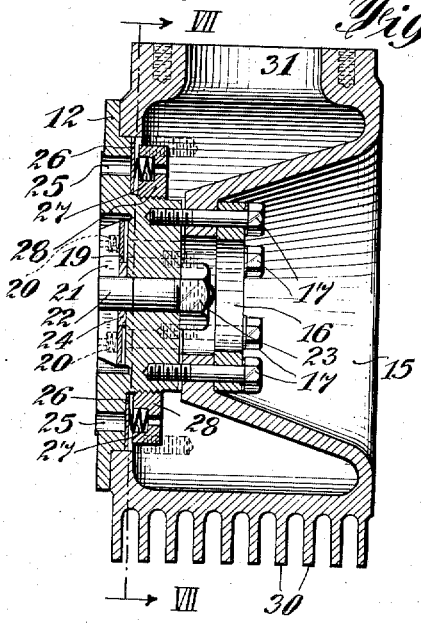
Figure 6 is a view to an enlarged scale of the valve mechanism shown in the right hand portion of Figure 1.
Figure 7:
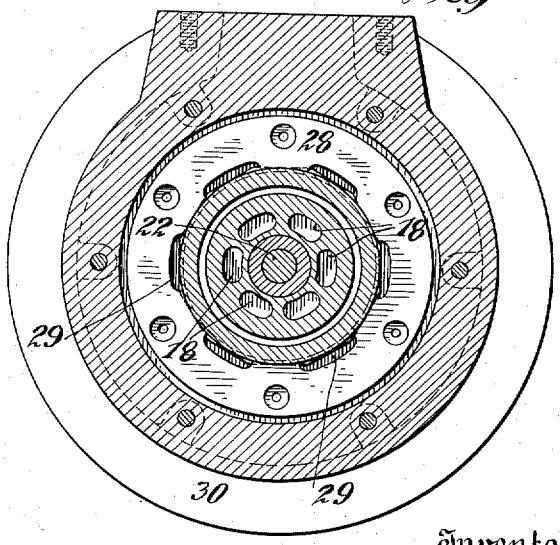
Figure 7 is a section on the line VII—VII of Figure 6.

In the illustrated embodiment of the invention there is provided a crank case 2 having a pair of coaxial cylinders 3 attached thereto. The cylinders are provided with pistons 4 connected to a crank pin 5 by connecting rods 6. The crank pin 5 is carried between two flywheels 7 and 8, the flywheel 7 being secured to a shaft 9 adapted to make power connection with the engine of an automotive vehicle and the flywheel 8 being connected to a shaft 10 for driving the air compressor and cooling fan.

Each cylinder is provided with a closure comprising a head 11 and a valve plate 12 interposed between the head and the end of the cylinder 3 said head and said valve plate constituting a removable end closure for the cylinder. Bolts 13 pass through the flange 14 and are threaded into the head 11 to secure the parts in place.

The head 11 is provided with a conical portion 15 terminating in an air inlet opening 16. The valve plate 12 lies across this opening and is secured to the head by bolts 17. Air inlet openings 18 are provided and the inlet valve is in the form of a flat ring 19. The valve 19 is pressed against the openings 18 by springs 20. Each of these springs is carried in an arm 21, the several arms being integral with a bolt 22 secured in the valve plate 12 by a nut 23. A washer 24 is provided for spacing the arms away from the valve seat and this washer is also effective for guiding the plate valve 19. On a suction stroke of the piston, air is drawn through the openings 18 past the valve 19 into the cylinder. On the compression stroke the compressed air passes outwardly through ports 25 past a plate valve 26. This plate is held against the valve seat by springs 27, the springs being carried by a ring 28 which is threaded onto the valve plate 12 as shown. The compressed air escapes into the head around the outside of the ring 28 and also through ports 29 provided therein.

While it is necessary to make the plate valves 19 and 26 and also the springs used in connection therewith of steel, it is preferred to make the remainder of the head from a metal having a high heat conductivity, such as aluminum. A difficulty which has always been experienced heretofore in portable air compressors has been the proper cooling of the valve structure, and the form shown in the drawings has given exceptionally good results. Not only is the head made of aluminum, which is of high heat conductivity, but this head is also provided with cooling fins 30. When the air is discharged around the outside of the ring 28, it strikes the aluminum wall of the head and a large portion of the heat of the compressed air is thereby removed. Similarly, any air passing through the ports 29 strikes against the walls of the conical portion 15 and is thus cooled. In addition to this the passage of cool air through the openings 18 to the inlet valve aids materially in maintaining the valve mechanism at proper temperature.

Each of the heads is provided with an outlet 31 for compressed air and these outlets are connected by a cross pipe 32 which also is preferably provided with cooling fins. The cross pipe 32 in the preferred form of our invention is made of aluminum, as it is found that this aids in maintaining the desired low temperature.

The various parts of the compressor are readily accessible, as will be apparent from Figure 1. If the screws 13 holding the heads on the cylinders and the screws 33 holding the cross pipe to the heads are removed, a head may be removed, together with its valve, for inspection or repair. The several parts of the valve may be quickly replaced so that even in the event of a break-down very little time will be consumed in putting the apparatus back into working condition. A breather pipe 34 is provided for the crank case and an oil sight 35 is also provided. The air compressor is secured to the vehicle frame by a connection plate 36 rigidly secured to the crank case 2. A pair of attachment members 37 are provided and are permanently secured in the channels 38 comprising a frame of the vehicle. They are provided with flanged and threaded ends 39 projecting beyond the radiator 40 of the vehicle and these ends engage the attachment plate 36. The plate is secured to these members by nuts 40.

We have found that in an apparatus like an air compressor where the load on the power shaft is extremely irregular, there is always a tendency for the power connection to crystallize and break unless some flexibility is provided therein. We accordingly make a flexible connection between the shaft 9 and the engine shaft 41 of the vehicle. A connection sleeve 42 is provided and to this is fastened a shaft 43 projecting through the opening usually provided adjacent the radiator for the engine crank. In the well known Ford automobile a pin is generally provided through the head end of the crank shaft for engagement by the crank. In making a connection to this type of engine, we remove this cross pin and provide dog point set screws 44 in the sleeve 42 which fit into the holes thus provided in the crank shaft 41. In order to make an extremely tight connection with the shaft we also provide draw bolts 45. These are so placed in the sleeve 44 that a side portion of each bolt projects into the space required for the shaft 41. The central opening of the sleeve is then bored out, leaving a notch in each of the bolts 45, and after the sleeve is placed on the shaft the bolts are drawn up tight by nuts 46. It is found that this exerts a spring clamping action on the shaft and prevents any play at this point.

The shaft 43 is provided with a spider 47 to which are bolted one or more flexible connecting disks 48. These disks are preferably made of fabric impregnated with rubber, such as are used in the well known Thermoid-Hardy universal joint. The disks 48 are secured to the spider by spaced apart bolts 49 and intermediate them bolts 50 are provided for securing to the ring a drum 51. Surrounding the drum 51 is a band 52 which is preferably provided with a suitable lining, such as brake lining 53. The band 52 is secured to a connecting member 54 which is carried on a pin 55 secured to a plate 56. Diametrically opposite the pin 55 is a similar pin 57 through which a bolt 58 passes and this bolt engages connection members 59 secured to the band 52. The plate 56 is secured to the shaft 9, and it will be seen that when the bolt 58 is tightened there will be provided a driving connection between the engine shaft 41 and the air compressor. When the bolt 58 is loosened the driving connection is broken and the vehicle may be operated in the ordinary way. It is not, however, necessary to remove the compressor and the apparatus may be moved from place to place and then the compressor very conveniently put into operation. When the bolt 58 is loosened springs 60 and 61 tend to hold the lining 53 away from the drum, so as to prevent heating. This clutch connection is particularly described and claimed in our copending application Serial No. 15,716, filed of even date herewith, patent No. 1,636,290.

The load imposed on the automobile engine of a large compressor is such that the ordinary cooling system is not sufficient to maintain the engine at suitable running temperature. We therefore provide an auxiliary cooling fan 62 which is mounted in front of the radiator 40. This fan is carried on a shaft 63 having a belt pulley 64 adapted to be driven through a belt 65 from a pulley 66 mounted on the shaft 10. The shaft 63 is carried in a bearing member 67 which is eccentrically mounted in a bracket 68 and secured therein by bolts 69. This provides a convenient means for tightening or loosening the belt 65, as may be required.

We provide an air compressor, of simple construction which may be readily attached to an automotive vehicle. The head and valve structure insures thorough cooling and is found in practice to give exceedingly good results. The cooling fan provided maintains the engine at the desired temperature and materially improves the operation of the entire apparatus. The valves are very simple and accessible and their construction and arrangement is practically desirable in a compressor of this type.

One reason is that the hot outlet annulus is outside the inlet annulus, so that its conductive path to the outer air is short; also the annular outlet valve 26 is of very great area as compared with the combined areas of the outlet passages 25. the proportions widthwise of the annulus being approximately three to one and circumferentially approximately six to one. This gives a relatively enormous area for quick heat transfer from the steel plate valve 26 to the aluminum valve plate 12, particularly during the relatively long portion of each cycle, when this outlet valve is closed and in close heat transfer relation to said aluminum valve plate 12; also the outlet valve being thin has small heat storing capacity per unit surface area.

While we have illustrated one embodiment of our invention, it is understood that it is not limited thereto but may be otherwise embodied within the scope of the following claims, and that it may be used for other gases besides air.

We claim:

1. An air compressor including a cylinder, an end closure therefor, valves for passages in said end closure, and means providing a metallic path of high heat conducting quality and capacity from said valves to the exterior of the compressor.

2. An air compressor including a cylinder, an end closure therefor, valves in said closure, and means providing a metallic path of high heat conducting quality and adequate capacity including an aluminum valve plate extending outward to the exterior of the compressor.

3. An air compressor including a cylinder, and a detachable aluminum closure therefor said closure having valve seats therein and providing a path of high heat conducting quality and capacity to atmosphere.

4. An air compressor including a cylinder having a head and a valve plate interposed between the cylinder and the head, both the head and the valve plate being made of a metal of relatively high heat conductivity.

5. In combination with an automotive vehicle having a radiator, an air-cooled air compressor of large capacity requiring the motor to be run under heavy load conditions said compressor being mounted adjacent the radiator, a driving connection between the engine of the vehicle and the compressor, and a fan mounted on the compressor in front of the radiator.

6. In a combination with an automotive vehicle having an internal combustion engine and a main driving shaft thereof, an air compressor of large capacity requiring the engine therefor to be run under heavy load conditions said compressor mounted on said vehicle and having a driving shaft arranged in alinement with said engine shaft, and a flexible coupling connecting said shafts comprising a flexible disk attached to one of the said shafts, a drum around the periphery of the disk, a flexible band connected to the other shaft and adapted to cooperate with the drum, and means for positively clamping the band around the drum to form a normally non-slipping driving connection, substantially as described.

7. In a combination with an automotive vehicle having an internal combustion engine and a main driving shaft thereof, an air compressor of large capacity requiring the engine therefor to be run under heavy load conditions said compressor mounted on said vehicle and having a driving shaft arranged in alinement with said engine shaft, and a flexible coupling connecting said shafts comprising a drum secured to one of said shafts and serving as one member of a clutch, a releasable clamping band encircling the drum and serving as the other member of the clutch, means to force the clamping band positively into clamping relation with said drum, supporting means for the band fixed to the other shaft, and a flexible disk interposed between one of the clutch members and its shaft.

8. An air compressor including a cylinder, a closure therefor, thin, large-area valves in said closure, and means providing a metallic path of high heat conducting quality and adequate capacity including an aluminum valve plate extending outward to the exterior of the compressor.

9. An air compressor including a cylinder, and a detachable aluminum closure therefor having valve seats and plate valves therein, said closure providing a path of high heat conducting quality and capacity to atmosphere.

10. An air-cooled air compressor of large capacity, including a cylinder, an aluminum end closure therefor affording a path to the atmosphere of high heat conducting quality and capacity and having outlet passages therein, in combination with a single outlet valve covering and extending between a plurality of said passages, with one of its surfaces extending adjacent and in effective heat transfer relation to the aluminum surfaces of said end closure around and between said outlet passages.

11. An air-cooled air compressor of large capacity, including a cylinder, an aluminum end closure therefor affording a path to the atmosphere of high heat conducting quality and capacity, and having inlet and outlet passages therein, the outlet passages being annularly arranged and of small aggregate area as compared with the area of the annulus, in combination with inlet and outlet valves for said passages, the outlet valve being a relatively thin annular plate having one of its surfaces extending adjacent and in effective heat transfer relation to the aluminum surfaces of said end closure around and between said outlet passages.

12. An air-cooled air compressor of large capacity, including a cylinder, an aluminum end closure therefor, affording a path to the atmosphere of high heat conducting quality and capacity having annularly arranged inlet passages and annularly arranged outlet passages surrounding said inlet passages, in combination with relatively thin annular plate valves adapted to close their respective inlet and outlet passages and each having large surface area adjacent and in effective heat transfer relation to the aluminum surfaces of the said end closure, around and between the several passages which said valve closes.

13. An air compressor including a compression chamber, a removable closure therefor, thin, large-area inlet and outlet plate valves for passages in said closure, and means providing a metallic path of high heat conducting quality and capacity from said valves to the exterior of the compressor.

14. An air compressor including a cylinder having a head and a valve plate interposed between the cylinder and the head and having a passage adapted to be closed by a relatively large thin valve; both the head and the valve plate being made of a metal of relatively high heat conductivity and the head having cooling fins thereon.

15. An air compressor including a cylinder, a closure therefor, a thin, large-area plate valve for passages in said closure, and means providing a metallic path of high heat conducting quality and capacity from said valve to the exterior of the compressor.

16. An air compressor including a compression chamber, a removable closure therefor, a valve for an outlet passage in said closure, and means providing a metallic path of high heat conducting quality and capacity from said valve to the exterior of the compressor.

17. In an air cooled compressor, a cylinder, a closure therefor including a valve plate of metal of high heat conducting capacity with an outer annular series of discharge openings and an inner annular series of inlet openings, a thin annular plate valve seating at one side of the valve plate and closing the outlet openings, and a thin annular plate valve seating at the other side of the valve plate and closing the inlet openings, whereby the inflowing air aids in maintaining the valve mechanism at proper temperature.

In testimony whereof we affix our signatures.

JAMES A. DAVEY.
PAUL H. DAVEY.
CHARLES L. GAUGLER.